E. W. BLACKHALL.
Pulley Fastener.

No. 220,215. Patented Oct. 7, 1879.

Witnesses.
A. Ruppert,
C. M. Connell

Inventor.
Edward W. Blackhall
Per Jas M Blanchard
Attorney.

UNITED STATES PATENT OFFICE.

EDWARD W. BLACKHALL, OF TORONTO, ONTARIO, CANADA, ASSIGNOR TO CHARLES V. KASSON, OF BUFFALO, NEW YORK.

IMPROVEMENT IN PULLEY-FASTENERS.

Specification forming part of Letters Patent No. 220,215, dated October 7, 1879; application filed April 24, 1879.

*To all whom it may concern:*

Be it known that I, EDWARD W. BLACKHALL, of Toronto, in the Province of Ontario and Dominion of Canada, have invented certain new and useful Improvements in Pulley-Fasteners; and I do hereby declare that the following is a full, clear, and exact description of the invention, which will enable others skilled in the art to which it appertains to make and use the same, reference being had to the accompanying drawings, and to the letters of reference marked thereon, which form a part of this specification—

Figure 1:
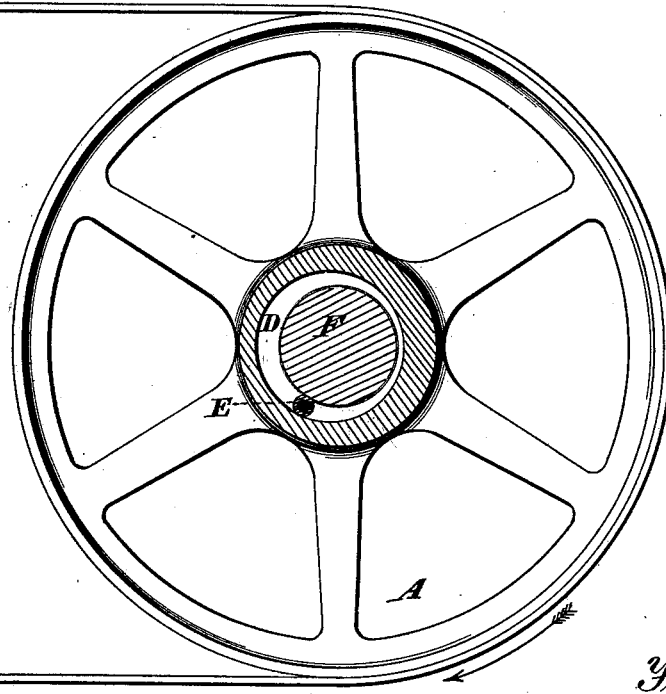
Figures 2, 3:
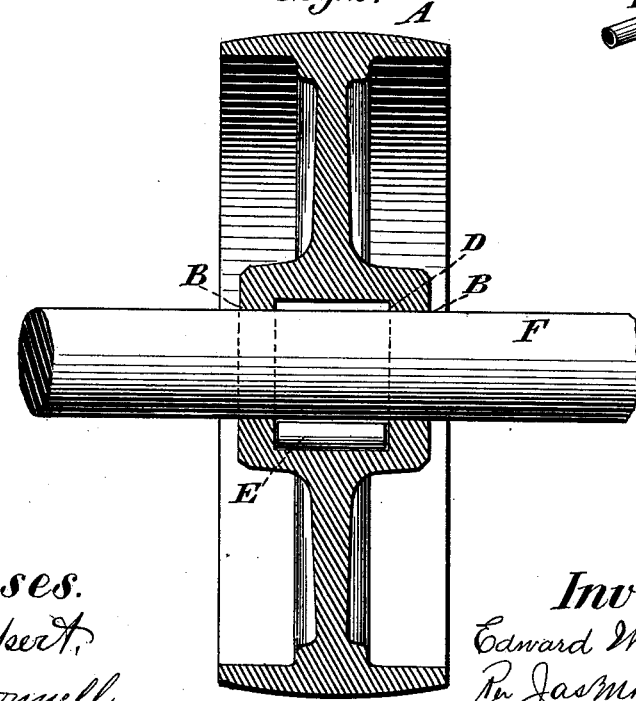

Figure 1 being an elevation, partly in section, of a pulley for driving, through the medium of a belt, a line of shafting or a machine, and showing an eccentric recess within its hub, the cylindrical pulley-fastener, and the shaft. Fig. 2 is a sectional elevation of a pulley, showing the shaft in position, the eccentrically-formed recess, and the pulley-fastener; and Fig. 3 is a perspective view of the fastener.

Corresponding letters denote like parts in all of the figures.

It is well known that the usual method of fastening pulleys upon their shafts consists in either providing both the pulley and the shaft with a spline or keyway and inserting a key therein, or by fixing a feather in the shaft and sliding the pulley upon it, or in using the other common expedient of inserting into the hub of the pulley a set-screw, which is made to press upon the shaft, and thus hold the pulley in the desired position.

All of the above-named methods have been found to be objectionable, as it frequently becomes necessary to change the position of pulleys upon the shafts, and at times to move them nearly the entire length thereof, in which case, when the keyway is used, it has to be at great expense made to traverse the entire, or nearly the entire, length of such shaft. If the set-screw be resorted to and the pulley has been properly fitted to its shaft, a burr is raised thereon, which makes it exceedingly difficult to move the pulley.

The object of this invention is to remedy the objections above recited, and to provide a means by which a pulley can be firmly held upon a shaft and prevented from rotating thereon, and at the same time allow of its being readily moved longitudinally or vertically, according to the position of the shaft; and to this end my invention consists in forming in the central portion of the hub of a pulley or other device which it is desirable to prevent from rotating upon its shaft while it is capable of ready adjustment longitudinally thereon, an eccentrically-formed recess extending entirely around the hub, in order that when it becomes necessary to change the direction in which the shaft rotates, it may be done without removing the pulley and without removing any of the parts of the device; and the invention further consists in combining, with a pulley having in it an eccentrically-formed recess, and the shaft upon which the pulley is carried, a cylinder of metal, wood, or other suitable material, of such dimensions as to admit of its being placed in the recess at its greatest point of distance from the shaft, whereby, when the pulley and cylinder are placed thereon and the pulley has been rotated sufficient to bring the cylinder into a narrow part of the recess, the effect will be to hold said pulley in its position and prevent any further rotation thereof, except as the shaft rotates with it.

In practicing my invention, I take any ordinary pulley, A, or other device which is to be used for giving rotation to a shaft, or which is to be rotated by a shaft, and, placing it in a lathe or other boring-machine, form in its center an aperture, B, concentric with the periphery thereof, or otherwise, as occasion may require, and of sufficient diameter to admit of its being freely slid upon its shaft; and in the central portion of the hub, as shown in Figs. 1 and 2, there is formed, either in the casting thereof or by boring, an eccentric recess, D, which in one part is so much larger than the aperture B as to admit of there being placed therein a small tube or cylinder, E, of metal, wood, or other suitable material, said tube or cylinder being for the purpose of preventing the rotation of the pulley beyond what is necessary to bring it (the cylinder) into a narrow part of the eccentric recess.

By referring to Fig. 1 of the drawings, it will be seen that the cylinder is in the proper position to prevent the pulley A from turning upon its shaft F when rotating in the direction indicated by the arrow; and it will also be seen that if it becomes desirable to rotate the parts in the opposite direction it is only necessary to change the direction in which the belt travels, when the pulley will partially rotate upon the shaft, which will bring the cylinder into the opposite narrow portion of the recess, and this change of position will cause the shaft to be rotated in the desired direction.

I am aware that a patent was granted to Charles Clareni on the 5th of September, 1854, in which provision is made for securing a pulley upon a shaft by means of a small roller placed in a cavity formed in the hub of the pulley; but mine differs from his, in that in mine a cylinder is made to prevent the pulley from turning in either direction without any partition in the cavity, as in the one referred to, and without the use of a second roller, as described by Clareni.

I do not claim, broadly, the forming of a recess in the hub of a pulley for the purpose of making a receptacle for a roller; neither do I claim, broadly, the combination of a roller with the cavity or recess formed in the hub of a pulley; but, Having fully described my invention, what I do claim, and desire to secure by Letters Patent, is—

1. A pulley or other similar device for imparting motion to a shaft or receiving motion therefrom, having in the central portion of its hub an eccentrically-formed recess extending entirely around said hub, as and for the purpose specified.

2. In combination with the eccentrically-formed recess D and shaft F, the tube or cylinder E, the parts being constructed and arranged for operation substantially as described, whereby they are made to prevent the pulley from rotating in either direction upon its shaft, as set forth.

In testimony that I claim the foregoing as my own I affix my signature in presence of two witnesses.

EWD. W. BLACKHALL.

Witnesses:
  CARL BEHN,
  HENRY BULL.